April 8, 1958   A. F. HASBROOK   2,830,227
PULSE INTENSIFYING CIRCUIT FOR CATHODE-RAY
OSCILLOGRAPH TUBES
Filed Feb. 17, 1954
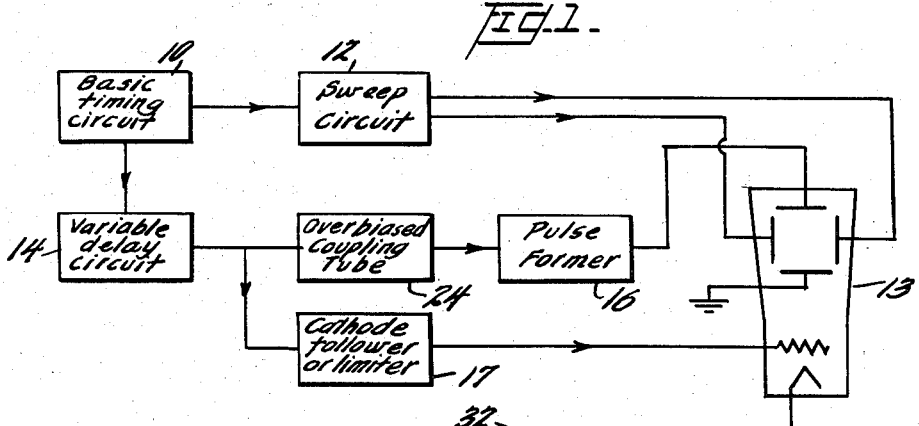
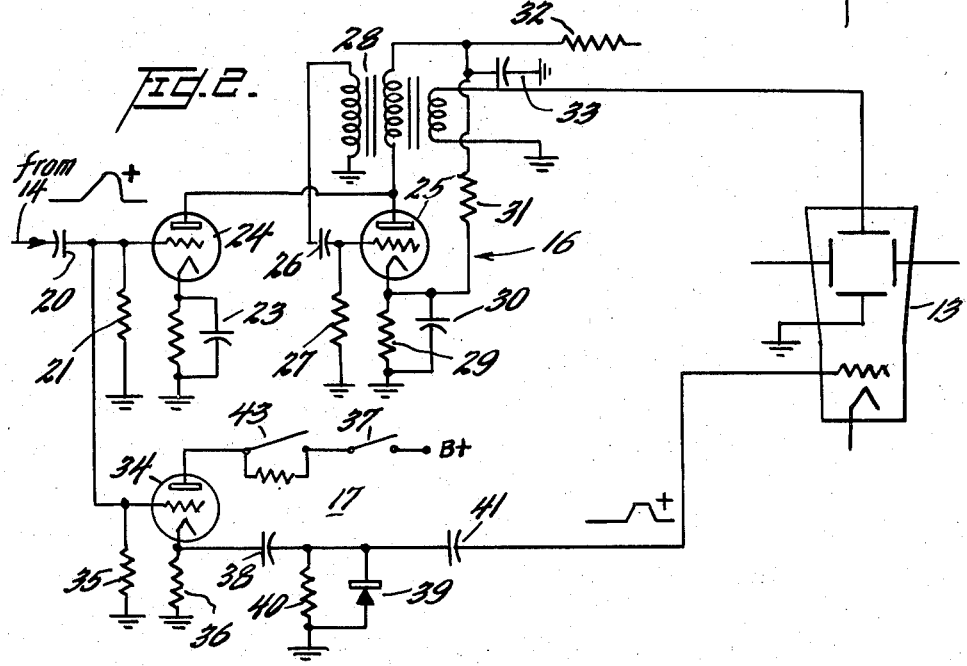
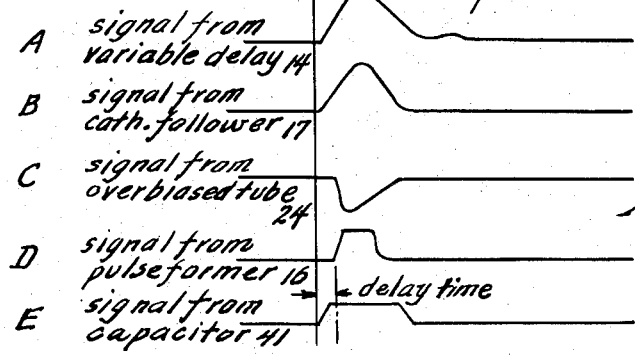
INVENTOR
Arthur F. Hasbrook,
BY Watson, Cole,
Grindle & Watson
ATTORNEYS United States Patent Office 2,830,227
Patented Apr. 8, 1958

2,830,227

PULSE INTENSIFYING CIRCUIT FOR CATHODE-RAY OSCILLOGRAPH TUBES

Arthur F. Hasbrook, Bexar County, Tex., assignor to Olive S. Petty, San Antonio, Tex.

Application February 17, 1954, Serial No. 410,971

4 Claims. (Cl. 315—22)

This invention is concerned with the cathode-ray tube display of pulses of short duration and more particularly with intensifying arrangements for displaying such pulses at high brilliance. It is well known that in cathode-ray oscillograph circuits, wherein short pulses are occasionally displayed on a repetitive sweep, the displayed pulse is often of such low intensity compared to the repeated overlapping sweep traces as to be difficult to view and interpret. The present invention provides an improved method of accurately gating in brilliance pulses which are variable in time with respect to the sweep.

It is a common expedient, suggested, for instance, in my prior U. S. Patent No. 2,604,622, granted July 22, 1952, so to control a cathode-ray tube having a straight time axis sweep as to blank out the ray during the retrace or flyback period, the grid potential of the tube being suitably controlled for this purpose, for instance by means of a gating signal. While this improves the clarity of the display, it does not meet the problem presented when pulses, arriving at intervals less frequent than the sweep intervals, are to be shown on a repetitive sweep trace, whether the trace be linear or circular.

It is therefore an object of the invention to provide, in a cathode-ray display in which pulses are displayed at a frequency less than that of the sweep cycle, means for intensifying the cathode beam at the time of arrival of the pulse, and preferably at an instant slightly preceding the actual display of the pulse, whereby the time of arrival of the pulse may be shown with greater clarity.

More specifically, the invention contemplates the application of a pulse concurrently to the deflecting elements of a cathode-ray tube and to an intensifying circuit supplying a correcting potential to the grid of the tube, whereby the brilliance of the pulse is increased. In the preferred practice of the invention, the application of the pulse to the deflecting elements of the tube is delayed slightly to permit the increase in luminosity to begin immediately before the display of the pulse on the screen.

Further objects and features of the invention will be apparent from the following description taken in connection with the accompanying drawings, in which Figure 1 is a block diagram illustrating one mode of applying the invention to the control of a cathode-ray tube employing a repetitive sweep;

Figure 2 is a wiring diagram showing in more detail certain of the elements represented in Figure 1, and Figure 3 is a series of curves showing the wave forms which may be derived at various points in the circuit shown in Figure 2.

In order to facilitate an understanding of the invention, reference is made to the embodiment thereof illustrated in the accompanying drawings and specific language is used to describe same. It will be appreciated, however, that this embodiment is illustrative only and that various alterations and modifications therein, and further applications thereof, such as would occur to those skilled in the art to which the invention relates, are contemplated as part of the invention.

Referring now to the drawing, Figure 1 illustrates a cathode-ray tube control system wherein a basic timing circuit 10 furnishes suitable sweep voltages via sweep circuit 12 to actuate the time axis sweep or trace of cathode-ray tube 13. Basic timing circuit 10 also furnishes suitable trigger or synchronizing signals to variable delay circuit 14 which then furnishes output pulses which are variable in time with respect to the output of timing circuit 10, and therefore with respect to the sweep trace on cathode-ray tube 13. These pulses are applied to the usual deflecting elements of the tube 13 so as to produce pulse deflection of the sweep trace in the conventional manner. The construction and function of circuits 10, 12, and 14 are conventional in design and the details thereof, which may vary widely, form no part of the instant invention.

Now in certain systems in which cathode-ray tubes may be used, the time relationship of variable delay circuit 14 and timing circuit 10 may be such that a number of sweeps of the cathode-ray trace on tube 13 occur for each pulse delivered by variable delay circuit 14. Consequently, the traces on tube 13 will tend to pile up or add up in brilliance, due to persistence in fluorescence and persistence in vision, so that the apparent intensity of the trace is quite high with respect to the intensity as displayed on the cathode-ray tube screen of the delayed pulse from circuit 14. This difference in intensity causes difficulty in viewing the pulse, which is of low intensity with respect to the brilliant trace. Difficulty may also be encountered in focusing both the pulse and the trace or baseline; that is, for large differences in brilliance, the delay pulse will be in focus when the trace is badly out of focus and vice versa. In other instances it may be desirable that only the trace interval during which the delayed pulse is present be displayed, the rest of the trace being of very low or zero intensity. For these and other reasons it is important that provision be made in precision work for intensifying the pulse interval with respect to the remainder of the sweep trace.

Since the leading edge of the pulse is often of great interest, the intensity gating signals are preferably applied to the cathode-ray tube slightly in advance of the pulse. In any event, for a pulse which does not recur on each sweep cycle, and which is variable in time with respect to the sweep, the gating signal must accurately vary in time with the pulse. In the present invention, this gating is accomplished by applying the pulse from variable delay circuit 14 to an overbiased coupling tube 24 which then actuates a synchronized pulse forming circuit 16. The gating signal is then formed by application of the pulse from circuit 14 directly to a cathode follower/limiter 17 and is supplied to the control grid of cathode-ray tube 13.

Referring now to the circuits shown in Figure 2, the pulse signal is applied from delay circuit 14 through capacitor 20 and grid resistor 21 to the control grid of overbiased coupling tube 24. Cathode resistor 22 biases the grid of tube 24 considerably beyond cutoff, so that the pulse amplitude must rise considerably before appearing as an output signal in the plate circuit of tube 24. The output of the tube 24 then actuates the blocking oscillator tube 25 and its associated circuit (constituting the pulse former 16 of Figure 1) which then furnishes an output pulse of the desired shape and amplitude to the signal deflection plates of cathode-ray tube 13. The pulse signal from 14 is also applied to the control grid of tube 34 (cathode follower/limiter 17 in Figure 1) and the output gating signal is taken from across the cathode resistor 36 and applied through capacitors 38 and 41, and clipping circuit 39 and 40, to the control grid of cathode-ray tube 13.

The gating signal may be caused to precede the pulse signal by the small desired time interval in the following manner. Referring to the wave forms of Figure 3, it is seen that the pulse A from delay circuit 14 occurs at what may be arbitrarily called zero time. The gating signal B output from cathode follower 17 also occurs essentially without delay because the cathode follower tube 34 follows very closely the input signal from circuit 14 impressed on its control grid. The delayed pulse from delay circuit 14 also actuates the overbiased coupling tube 24, which is biased considerably beyond cut-off, or below the level at which the output of tube 24 will trigger the blocking oscillator tube 25. Thus a pulse signal such as that from circuit 14, shown in Figure 3, will not actuate overbiased tube 24 until the amplitude of the leading edge of the pulse is sufficiently large to exceed the excessive bias. Since the rise time of a signal is always finite, it follows that the output from overbiased tube 24 will be delayed somewhat as in wave form C of Figure 3. This delayed output then triggers the blocking oscillator tube 25 of pulse former 16, which then furnishes the output signal pulse D to the cathode-ray tube 13.

With reference again to the gating pulse furnished by tube 34 so as to intensify the trace of cathode-ray tube 13 at the proper time, it should be noted that the desired gate shape is one in which the amplitude is essentially constant, so as to maintain the same trace brilliance for the short period to increase the pulse brilliance. Since the output signal B from a cathode follower usually will be somewhat triangular, or at least not square, it is desirable to provide a limiting circuit, for example as illustrated in Figure 2, by crystal diode 39 and its associated circuit resistor 40. The action of diode 39 is to conduct when the impressed signal voltage exceeds a determined level and thus provide a more nearly square gating signal, which may appear as illustrated in wave form E. Being derived from the initial signal pulse, the gating signal normally terminates at the trailing end of the pulse.

In the above description it has been assumed that switches 37 and 43 are closed so as to supply B+ voltage to tube 34 and thus permit amplification and gating signal output to capacitor 38 and thence to cathode-ray tube 13. However, it may be desirable at times to remove the delayed pulse entirely from the trace so as to avoid confusion with other signals, and in this event, it is necessary that the gating signal also be removed. It is well known that it is impractical to switch the signals directly in circuits utilizing short pulses because of capacity effects; accordingly, in the present invention, all switching is accomplished by means of cathode follower tube 34. As explained above, when switch 37 is closed, voltage is applied to tube 34 which then functions normally. If switch 37 is open, however, the lack of plate potential causes tube 34 not only to cease operation as an amplifier, but also to function as a diode limiter, the control grid and cathode of tube 34 functioning as the diode elements. This diode limiter is then across grid resistor 35 and also across the grid circuit of overbiased tube 24. Thus the amplitude of the delayed pulse signal from 14, applied at the grid of overbiased tube 24, is limited to a value much lower than that required to actuate tube 24 and subsequent blocking oscillator tube 25. Under these conditions, there is no signal output from pulse former 16 to cathode-ray tube 13, so that both the delayed pulse and the gating signal are suppressed by opening switch 37.

When it is desired to permit display of signal pulses but without significant intensification of the cathode-ray trace, switch 37 is closed and switch 43 is opened, so that plate dropping resistor 42 is connected in the plate voltage supply to tube 34. Now the value of the plate voltage on tube 34 may, by proper selection of the value of 43, be such that tube 34 will not act as diode limiter on the delayed pulses from 14, but also will not perform as an effective coupling circuit for output gating signals via cathode resistor 36. Thus the gating signals may be made zero or quite small by opening switch 43. In this manner one may selectively utilize: (1) Both delayed pulses and associated intensity gating signal; (2) neither pulses nor gating; and (3) delayed pulses with zero or a minimum of intensity gating.

While I have described the invention in its application to a cathode-ray tube in which the beam displacement is effected by the use of deflection electrodes of the electrostatic type, it will be appreciated that the invention is equally applicable to tubes employing electromagnetic deflecting coils. It will further be appreciated that the invention is not restricted to systems using multiple linear sweeps, but may be employed with equal advantage in systems displaying a circular or other repetitive form of sweep trace. The invention is also effective when random rather than synchronized pulses are displayed, and is generally desirable in any cathode-ray display system in which added brilliance of the pulse is necessary for clarity.

Having thus described the invention, what is claimed as new and desired to be secured by Letters Patent is:

1. In a pulse intensifying system for a cathode-ray tube having means for energizing the tube to provide a repetitive sweep trace and means to produce pulse deflection of the trace in response to signal pulses at intervals substantially greater than the sweep interval, the combination with a circuit for supplying to the deflecting elements of the cathode-ray tube signal pulses of a duration which are short compared with the length of the sweep trace, of a circuit responsive to said pulses for supplying to the control grid of the cathode-ray tube, during the display of the pulse on the tube screen, a gating signal to increase momentarily the beam intensity, said last named circuit comprising a cathode-follower tube connected across said first named circuit, and means selectively operable to remove the plate supply voltage from said cathode-follower tube to terminate the supply of signal pulses and gating signals to said cathode-ray tube.

2. In a pulse intensifying system for a cathode-ray tube having means for energizing the tube to provide a repetitive sweep trace and means to produce pulse deflection of the trace in response to signal pulses at intervals substantially greater than the sweep interval, the combination with a circuit for supplying to the deflecting elements of the cathode-ray tube signal pulses of a duration which are short compared with the length of the sweep trace, of a circuit responsive to said pulses for supplying to the control grid of the cathode-ray tube, during the display of the pulse on the tube screen, a gating signal to increase momentarily the beam intensity, said last named circuit comprising a cathode-follower tube connected across said first named circuit, and means selectively operable to reduce the plate supply voltage to said cathode-follower tube to interrupt the supply of gating signals to said cathode-ray tube.

3. In a pulse intensifying system for a cathode-ray tube having means for energizing the tube to provide a repetitive sweep trace and means to produce pulse deflection of the trace in response to signal pulses at intervals substantially greater than the sweep interval, the combination with a circuit for supplying to the deflecting elements of the cathode-ray tube signal pulses of a duration which are short compared with the length of the sweep trace, of a circuit responsive to said pulses for supplying to the control grid of the cathode-ray tube, during the display of the pulse on the tube screen, a gating signal to increase momentarily the beam intensity, said last named circuit comprising a cathode-follower tube having an input circuit including a grid impedance element connected across said first named circuit, and means selectively operable to remove the plate supply voltage from said cathode-follower tube to terminate the supply of signal pulses and gating signals to said cathode-ray tube in response to grid current flow in said grid impedance element.

4. In a pulse intensifying system for a cathode-ray tube having means for energizing the tube to provide a repetitive sweep trace and means to produce pulse deflection of the trace in response to signal pulses at intervals substantially greater than the sweep interval, the combination with a circuit for supplying to the deflecting elements of the cathode-ray tube signal pulses of a duration which are short compared with the length of the sweep trace, of a circuit responsive to said pulses for supplying to the control grid of the cathode-ray tube, during the display of the pulse on the tube screen, a gating signal to increase momentarily the beam intensity, said last named circuit comprising a cathode-follower tube connected across said first named circuit, and means selectively operable to reduce the plate supply voltage to said cathode-follower tube to modify the amplitude of the gating signals applied to said cathode-ray tube.

References Cited in the file of this patent

UNITED STATES PATENTS

| | | |
|---|---|---|
| 2,411,963 | George | Dec. 3, 1946 |
| 2,434,264 | Edson | Jan. 13, 1948 |
| 2,465,364 | Ferrar | Mar. 29, 1949 |
| 2,492,700 | Jeanne | Dec. 27, 1949 |
| 2,620,455 | Fockler | Dec. 2, 1952 |
| 2,648,027 | Geohegan | Aug. 4, 1953 |
| 2,700,741 | Brown et al. | Jan. 25, 1955 |